United States Patent
Akita et al.

(10) Patent No.: US 11,546,921 B2
(45) Date of Patent: Jan. 3, 2023

(54) WIRELESS COMMUNICATION APPARATUS AND SERVER APPARATUS

(71) Applicant: DENSO CORPORATION, Kariya (JP)

(72) Inventors: Hidenori Akita, Kariya (JP); Ryo Tamura, Kariya (JP); Keisuke Kunitomo, Kariya (JP); Takuya Miyasaka, Fujimino (JP); Takeshi Kitahara, Fujimino (JP); Osamu Kobayashi, Fujimino (JP); Ryuu Mizoguchi, Fujimino (JP)

(73) Assignee: DENSO CORPORATION, Kariya (JP)

( * ) Notice: Subject to any disclaimer, the term of this patent is extended or adjusted under 35 U.S.C. 154(b) by 78 days.

(21) Appl. No.: 17/172,108

(22) Filed: Feb. 10, 2021

(65) Prior Publication Data

US 2021/0258973 A1 Aug. 19, 2021

(30) Foreign Application Priority Data

Feb. 13, 2020 (JP) .............................. JP2020-022721

(51) Int. Cl.
| | |
|---|---|
| *H04B 15/00* | (2006.01) |
| *H04W 72/10* | (2009.01) |
| *H04W 4/02* | (2018.01) |
| *H04B 17/373* | (2015.01) |
| *H04W 4/40* | (2018.01) |

(52) U.S. Cl.
CPC .......... *H04W 72/10* (2013.01); *H04B 17/373* (2015.01); *H04W 4/02* (2013.01); *H04W 4/40* (2018.02)

(58) Field of Classification Search
CPC ......... H04W 72/10; H04W 4/02; H04W 4/40; H04B 17/373
USPC ......................................................... 455/501
See application file for complete search history.

(56) References Cited

U.S. PATENT DOCUMENTS

| | | | | |
|---|---|---|---|---|
| 2011/0275321 | A1* | 11/2011 | Zhou ................. | H04M 1/72454 455/41.2 |
| 2014/0018116 | A1* | 1/2014 | Novak ................ | H04W 72/082 455/501 |
| 2019/0285427 | A1* | 9/2019 | Tamura .............. | G01C 21/3484 |
| 2019/0289474 | A1* | 9/2019 | Ozaki ............... | H04W 72/1231 |
| 2019/0349713 | A1* | 11/2019 | Obara ..................... | H04W 4/40 |

OTHER PUBLICATIONS

3GPP TS 23.502 v 15.2.0 (Jun. 2018); 3$^{rd}$ Generation Partnership Project; Technical Specification Group Services and System Aspects; Procedures for the 5G System; Stage 2 (Release 15); 4.16.7.2 Procedures for future background data transfer, pp. 1-308.

* cited by examiner

*Primary Examiner* — April G Gonzales
(74) *Attorney, Agent, or Firm* — Harness, Dickey & Pierce, P.L.C.

(57) ABSTRACT

A wireless communication apparatus mounted on a mobile body includes a transmitter and a receiver. The transmitter is configured to transmit position information indicating a position to which the mobile body is scheduled to move, to a server apparatus. The receiver is configured to receive communication quality information indicating a communication quality corresponding to the position, from the server apparatus. The transmitter is configured to transmit the date at a communication position specified based on the communication quality information.

18 Claims, 3 Drawing Sheets

WIRELESS COMMUNICATION APPARATUS AND SERVER APPARATUS

CROSS REFERENCE TO RELATED APPLICATION

The present application claims the benefit of priority from Japanese Patent Application No. 2020-022721 filed on Feb. 13, 2020. The entire disclosure of the above application is incorporated herein by reference.

TECHNICAL FIELD

The present disclosure relates to a wireless communication apparatus mounted on a mobile body, and more particularly to a wireless communication apparatus mounted on a vehicle, a program and method used in the apparatus, and a server apparatus that communicates with the apparatus.

BACKGROUND

In recent years, the demand for services utilizing big data has been increasing. In particular, in the field of automobiles, various data indicating the behavior of automobiles and the internal and external conditions of automobiles acquired by sensors mounted on automobiles are collected and used for safe driving of automobiles and automatic driving technology.

The data used for big data is transmitted to an information collecting apparatus installed outside the vehicle using an in-vehicle wireless communication apparatus mounted on the vehicle.

SUMMARY

According to an example of the present disclosure, a wireless communication apparatus mounted on a mobile body is provided to include a transmitter and a receiver. The transmitter is configured to transmit position information indicating a position to which the mobile body is scheduled to move, to a server apparatus. The receiver is configured to receive communication quality information indicating a communication quality corresponding to the position, from the server apparatus. The transmitter is configured to transmit the date at a communication position specified based on the communication quality information.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereafter, a description will be given to embodiments of the present disclosure with reference to the drawings.

In the present disclosure, the configuration disclosed in each embodiment is not limited to each embodiment alone, but may be combined across the embodiments. For example, the configuration disclosed in one embodiment may be combined with another embodiment. Further, the disclosed configurations may be collected and combined in each of the plurality of embodiments.

First Embodiment

1. Configuration of Communication System

Figure 1:
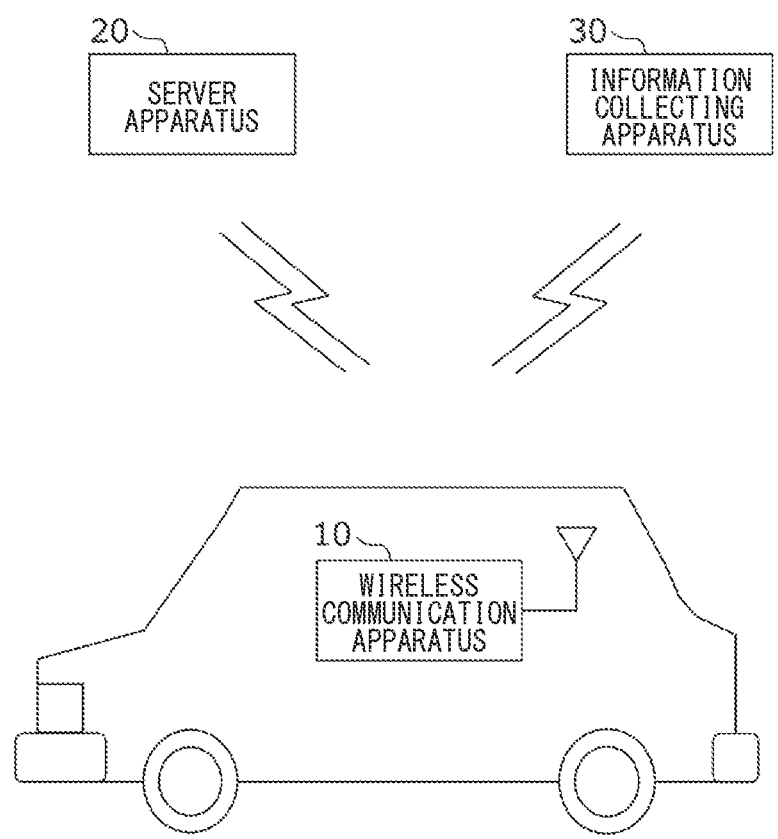
FIG. 1 is a block diagram of a communication system including a wireless communication apparatus and a server apparatus according to first to third embodiments.

FIG. 1 shows a communication system 1. The communication system 1 includes a wireless communication apparatus 10, a server apparatus 20, and an information collecting apparatus 30.

The wireless communication apparatus 10, which is mounted on a mobile body, performs wireless communication with the server apparatus 20 and the information collecting apparatus 30. The embodiment will describe an example in which the wireless communication apparatus 10 is mounted on a vehicle. However, the wireless communication apparatus 10 may be mounted on the "mobile body" and may not necessarily be the in-vehicle wireless communication apparatus 10.

Here, the "mobile body" means a movable object, and the moving speed is freely determined. Of course, it also includes the case where the mobile body is stopped. For example, the mobile body includes, but not limited to, an automobile, a motorcycle, a bicycle, a pedestrian, a ship, an aircraft, and an object mounted on each of them.

The server apparatus 20 is an apparatus that manages wireless communication infrastructure apparatuses such as a base station and a core network, and is managed by, for example, a telecommunications carrier that provides a communication network.

The information collecting apparatus 30 is an apparatus that collects various types of data used for big data. In the embodiment shown below, the information collecting apparatus 30 collects data on the vehicle transmitted from the wireless communication apparatus 10 mounted on the vehicle.

2. Configuration of Wireless Communication Apparatus

The configuration of the wireless communication apparatus 10 will be described with reference to FIG. 2. The wireless communication apparatus 10 includes a travel plan acquisition unit 101, a vehicle data acquisition unit 102, a storage 103, a communicator device 104, and a controller circuit 105. As an example in the present disclosure, the controller circuit 105 is provided as a computer including a CPU as a processor, memories including RAM, ROM, and I/O interfaces.

Note that each of the travel plan acquisition unit 101 and the vehicle data acquisition unit 102 may be provided as a controller circuit, which may be combined with the controller circuit 105. Thus, the wireless communication apparatus 10 may include one or more controller circuits. Further, such an individual controller circuit described in the present disclosure may be implemented by one or more special-purpose computers. Such computers may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) the memory and the processor programmed to execute one or more particular functions embodied in computer programs and (b) the processor provided by one or more hardware logic circuits.

The travel plan acquisition unit 101 acquires the travel plan of the vehicle. This travel plan includes, for example, position information indicating the "position" to which the vehicle is scheduled to move, and time information indicating the clock time when the vehicle reaches the position. When the vehicle is an automatic driving vehicle, a travel plan to the destination of the vehicle is obtained in advance by the automatic driving system. Also, even if the vehicle is manually operated by the driver, the navigation system presents the driver with a recommended travel plan to the destination. Therefore, the travel plan acquisition unit 101 acquires the travel plan information obtained in advance by the automatic driving system or the navigation system, and acquires the position where the vehicle is scheduled to move and the clock time when the vehicle is scheduled to reach the position in this travel plan.

Here, the "position" includes a specific point represented by latitude and longitude, as well as an area having a certain size of area.

The vehicle data acquisition unit 102 acquires various data related to the vehicle (hereinafter, vehicle data). Vehicle data is data acquired by the "sensors" mounted on the vehicle. The various data includes the latitude/longitude indicating the position of the vehicle, the behavior of the vehicle (for example, acceleration/deceleration, turning angular velocity, accelerator opening, etc.), and a still image or moving image of the inside or outside of the vehicle.

Here, the "sensor" includes a GPS, a speedometer, an accelerometer, and a camera. The vehicle data acquired by the "sensor" include, for example, position information, speed information, acceleration information, moving images, still images, surrounding feature information, or a combination thereof.

The storage 103 stores the vehicle data acquired by the vehicle data acquisition unit 102 via the controller circuit 105. The storage 103 temporarily stores the vehicle data until the vehicle data is transmitted from the communicator device 104 described later. The vehicle data, which was transmitted from the communicator device 104, is deleted from the storage 103 by the controller circuit 105.

Although the storage 103 assumes a random access memory, it may be a hard disk (HDD), a flash memory, or the like. In this case, even if the power is turned off, the data can be saved without being erased.

The communicator device 104 may also be referred to as a transceiver 104 or a transmitter and receiver 104. The communicator device 104 communicates using a plurality of communication services. The communication service means, for example, a communication contract with a telecommunications carrier, a usable communication band, and the like. The embodiments below will describe a case where the communicator device 104 communicates using two communication services. The communicator device 104 communicates by a cellular communication method such as 4G or 5G, but the communicator device 104 is not limited to these communication methods. Further, although it is assumed that the same communication method is used as the communication method used in the two communication services, different communication methods may be used.

One of the communication services used by the communicator device 104 of the present embodiment (hereinafter, a first communication service) is a service applied when communication is performed at a position specified by the position specifying unit described later. In this first communication service, the position where communication is performed is limited, but communication can be performed while ensuring a certain level of communication quality. Further, by limiting the position where communication is performed, it is expected that the communication fee is cheaper than that of other communication services. The communicator device 104 further uses a second communication service to perform communication. This second communication service, which is different from the first communication service, is a service applied when communication is performed regardless of the position of the vehicle. Since the position where the second communication service is performed is not limited, the communicator device 104 can transmit the data to the outside at an optional timing when the second communication service is used. The second communication service is a communication service in which the communication speed may decrease when the number of communication terminals existing in a specific communication area is large.

Note that which of the first communication service and the second communication service the communicator device 104 uses for communication is determined by the controller circuit 105 (i.e., CPU), which will be described later, according to the type of data to be transmitted.

The communicator device 104 is a communicator device that receives and transmits user data, which is data used by the user of the vehicle. The user data includes data directly used by the user, such as data useful for the user to drive the vehicle such as traffic information, and data for entertainment of the user such as music and video. The user data further includes data that is not directly used by the user, but is indirectly used by the user to drive the vehicle, such as control information that controls the automatic driving vehicle from outside the vehicle. Here, among the user data, traffic information and control information are data required in real time. In addition, the entertainment data of the user is often the data for which the user himself bears the communication service cost, and it is desirable that the data be transmitted and received preferentially. Therefore, these user data are communicated regardless of the position of the vehicle, that is, using the second communication service.

The communicator device 104 further transmits the position information and the time information acquired by the travel plan acquisition unit 101 to the server apparatus 20, and receives the communication quality information transmitted from the server apparatus 20. The "communication quality information" is information indicating "communication quality" corresponding to the position and clock time indicated by the position information and the time information transmitted by the communicator device 104. Details of the communication quality information will be described later. Since it is desirable that these pieces of information be transmitted to and received from the server apparatus 20 regardless of the position of the vehicle, they are communicated using the second communication service.

Here, "communication quality" refers to an index that affects or is affected by communication quality, or an agreement regarding communication quality. Examples of the above index include the degree of communication congestion, the SN ratio, and the communication speed. Further, the above agreement is an agreement that, for example, when there is a response to the position information, it indicates that there is a predetermined communication quality. The "communication quality information" includes (i) a numerical value indicating communication quality, (ii) information expressing this numerical value using a specific value or symbol, or (iii) information according to a communication quality agreement.

The communicator device 104 further transmits the vehicle data acquired by the vehicle data acquisition unit 102 to the information collecting apparatus 30. Here, vehicle data is mainly used as big data, and real-time performance is often not required. Therefore, the communicator device 104 communicates the vehicle data using the first communication service at the position specified by the position specifying unit described later.

The controller circuit 105 controls whether the data communicated by the communicator device 104 is communicated by using the first communication service or the second communication service. In the present embodiment, the vehicle data is controlled to communicate using the first communication service; in contrast, the position information, the time information, and the user data are controlled to communicate using the second communication service.

The controller circuit 105 (i.e., CPU) of the present embodiment further realizes a position specifying unit that "specifies" a position for transmitting vehicle data to the information collecting apparatus 30 based on the communication quality information transmitted from the server apparatus 20. Hereinafter, the position specified by the position specifying unit is referred to as a communication position for communicating vehicle data.

"Specifying" includes not only obtaining a communication position by the wireless communication apparatus 10 but also using the position determined by the server apparatus 20 as it is as the communication position.

The position specifying unit specifies a communication position for transmitting vehicle data based on the communication quality information transmitted from the server apparatus 20. The communication quality information is, for example, statistical data of the congestion degree of past communication at the position indicated by the position information and the clock time indicated by the time information transmitted by the communicator device 104. In this case, the position specifying unit specifies a position where the degree of congestion indicated by the communication quality information is lower than the predetermined degree of congestion as the communication position. The predetermined degree of congestion to be compared with the communication quality information may be a value that is uniquely determined according to the conditions, in addition to the case where it is always constant. The communication quality information is not limited to the degree of congestion of communication, and may be, for example, the SN ratio of communication at the corresponding position and clock time, the communication speed, or a combination thereof. In either case, the position specifying unit specifies a position where data can be transmitted with a predetermined communication quality as a communication position based on the communication quality information.

The communication quality information may be the numerical values of the congestion degree, the SN ratio, and the communication speed described above. However, it may be an index that expresses these numerical values using specific values or symbols. For example, it may be represented by 0 to 100, 5-grade evaluation, symbols (○, x, Δ) and the like. Even in such a case, the position specifying unit specifies a position indicating that the index indicated by the communication quality information is higher than the predetermined communication quality as the communication position. For example, the communication quality information is represented by a value from 0 to 100, and the larger the value, the higher the communication quality. If so, the position specifying unit specifies a position where the communication quality information is larger than a predetermined value (for example, 70) as a communication position. Such an index may be classified based on a predetermined evaluation standard, and the number of classifications may be several.

As another example, the communication quality information may be information indicating either communication is possible or communication is not possible. In this case, the position specifying unit specifies a position indicating that the communication quality information is communicable as a communication position.

As yet another example, when the position specifying unit receives a response to the position information and the time information from the server apparatus 20 at a position, the position specifying unit may specify the position as a communication position. In this example, the wireless communication apparatus 10 agrees in advance with the server apparatus 20 in respect that the server apparatus 20 responds to the position information and the time information only when the communication quality corresponding to the position and clock time indicated by the position information and time information is higher than the predetermined communication quality. Alternatively, the wireless communication apparatus 10 may agree with the server apparatus 20 in respect that the server apparatus 20 responds only when the communication quality corresponding to the position and clock time is lower than the predetermined communication quality.

3. Configuration of Server Apparatus

Figure 2:
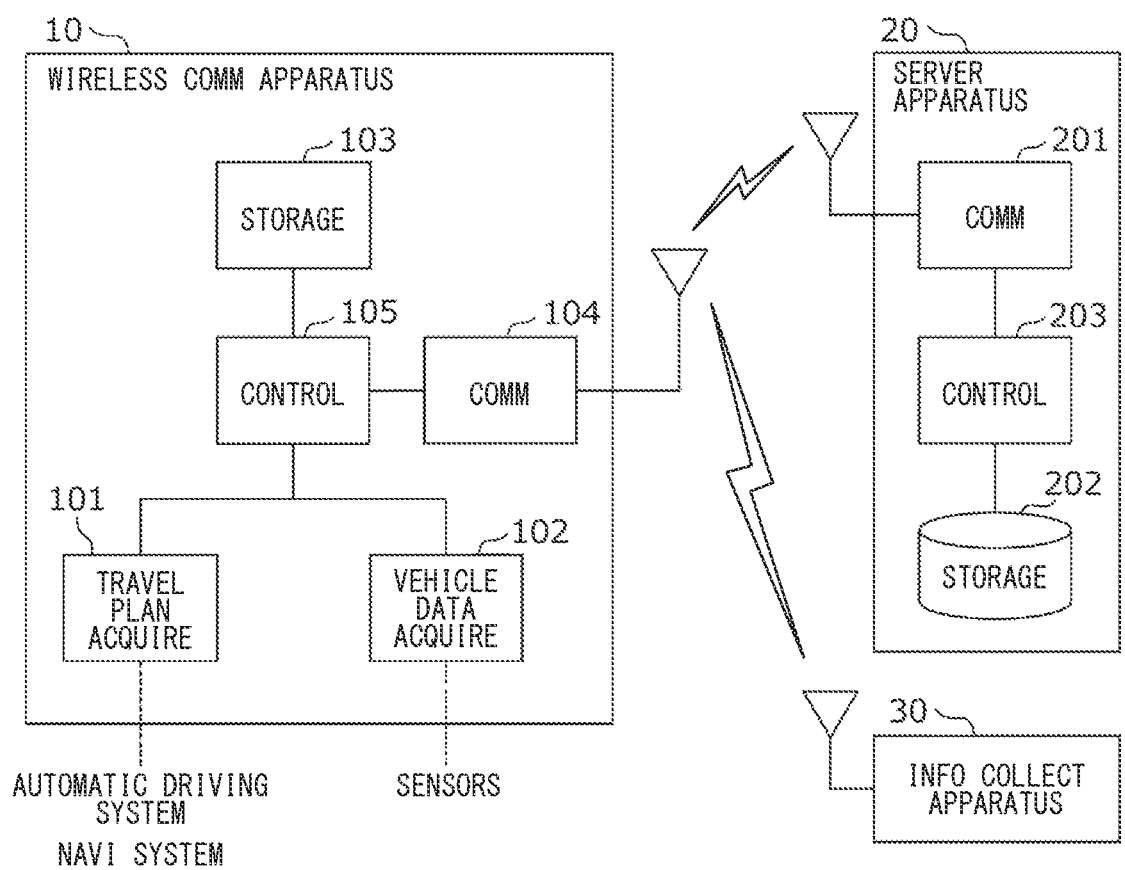
FIG. 2 is a block diagram showing a configuration of a wireless communication apparatus and a server apparatus according to the first to third embodiments.

FIG. 2 further schematically shows the configuration of the server apparatus 20. The server apparatus 20 includes a communicator device 201, a storage 202, and a controller circuit 203. As an example in the present disclosure, the controller circuit 203 is provided as a computer including a CPU as a processor, memories including RAM, ROM, and I/O interfaces. Further, similar to the controller circuit 105, the controller circuit 203 may be implemented by one or more special-purpose computers.

The communicator device 201 may also be referred to as a transceiver 201 or a transmitter and receiver 201. The communicator device 201 receives the position information and the time information transmitted from the wireless communication apparatus 10. The communicator device 201 further transmits communication quality information indicating communication quality corresponding to the position indicated by the position information and the clock time indicated by the time information to the wireless communication apparatus 10.

The storage 202 stores numerical values indicating communication quality such as congestion degree, SN ratio, and communication speed in association with the position and clock time. The congestion degree and the like stored in the storage 202 are, for example, statistical data of the congestion degree measured in the past at the position and clock time.

The controller circuit 203 (i.e., CPU) realizes a quality information generating unit that generates communication quality information indicating communication quality corresponding to the position information and time information received by the communicator device 201. Specifically, the quality information generating unit extracts values such as the degree of congestion corresponding to the position information and the time information received from the wireless communication apparatus 10 from the storage 202 and "generates" them as communication quality information.

"Generating" includes not only obtaining communication quality information by calculation but also using the information stored in the storage as the communication quality information as it is.

The quality information generating unit may use the numerical value extracted from the storage 202 as it is as communication quality information. Alternatively, the quality information generating unit may generate the communication quality information by converting the numerical value extracted from the storage 202 into an index such as a value from 0 to 100, a five-level evaluation, a symbol, or information indicating either communication is possible or communication is not possible. Alternatively, the quality information generating unit may generate a response message for the wireless communication apparatus 10 as communication quality information only when the degree of congestion or the like stored in the storage 202 is higher than the predetermined communication quality.

Communication quality information may be expressed not by numerical values such as congestion degree, but by a specific index, information indicating communication availability or communication failure, or the presence or absence of a response message. In this case, the server apparatus 20 can also control the wireless communication apparatus 10 so that the communication of vehicle data is not concentrated in a specific communication area. For example, when the server apparatus 20 receives the same position information and time information from a plurality of wireless communication apparatuses 10, the server apparatus 20 may transmit communication quality information indicating low congestion to all wireless communication apparatuses 10. In this case, the communication of vehicle data is concentrated at the position and clock time, and there is a possibility that the degree of congestion is actually high. Therefore, when the same position information and time information are received, the server apparatus 20 transmits communication quality information (for example, "70", "communication possible", or response message) indicating that the communication quality is high to some wireless communication apparatuses, and communication quality information (for example, "30", "communication impossible") indicating that the communication quality is low to the other wireless communication apparatuses. If the wireless communication apparatus that has received the communication quality information indicating that the communication quality is high transmits the vehicle data at a specific position and clock time, the communication quality at that position and clock time may deteriorate. Therefore, it can be said that both the communication quality information indicating that the communication quality is high and the communication quality information indicating that the communication quality is low indicate the communication quality corresponding to the position and clock time. In this way, the quality information generating unit may control the communication of vehicle data so as not to be concentrated at a specific position and clock time by generating different communication quality information for each of the plurality of wireless communication apparatuses.

In addition, the quality information generating unit may generate communication quality information using information other than past statistical data. Since the server apparatus 20 is an apparatus that manages the infrastructure apparatuses for wireless communication, it is possible to acquire information on the communication quality of real-time communication of the infrastructure apparatuses under the control of the server apparatus 20. Therefore, when the communicator device 201 receives the position information and the time information, the quality information generating unit may predict how crowded the base stations in the communication area at the position indicated by the position information will be at the clock time indicated by the time information based on the degree of communication congestion of the base station in the communication area including the position indicated by the position information and the base station adjacent to the base station. The quality information generating unit may then transmit the predicted communication congestion degree to the wireless communication apparatus 10 as communication quality information.

Since the configuration of the server apparatus 20 is common to the first to third embodiments, the description of the server apparatus 20 will be omitted in the following embodiments.

4. Operations of Respective Apparatuses Included in Communication System

Figure 3:
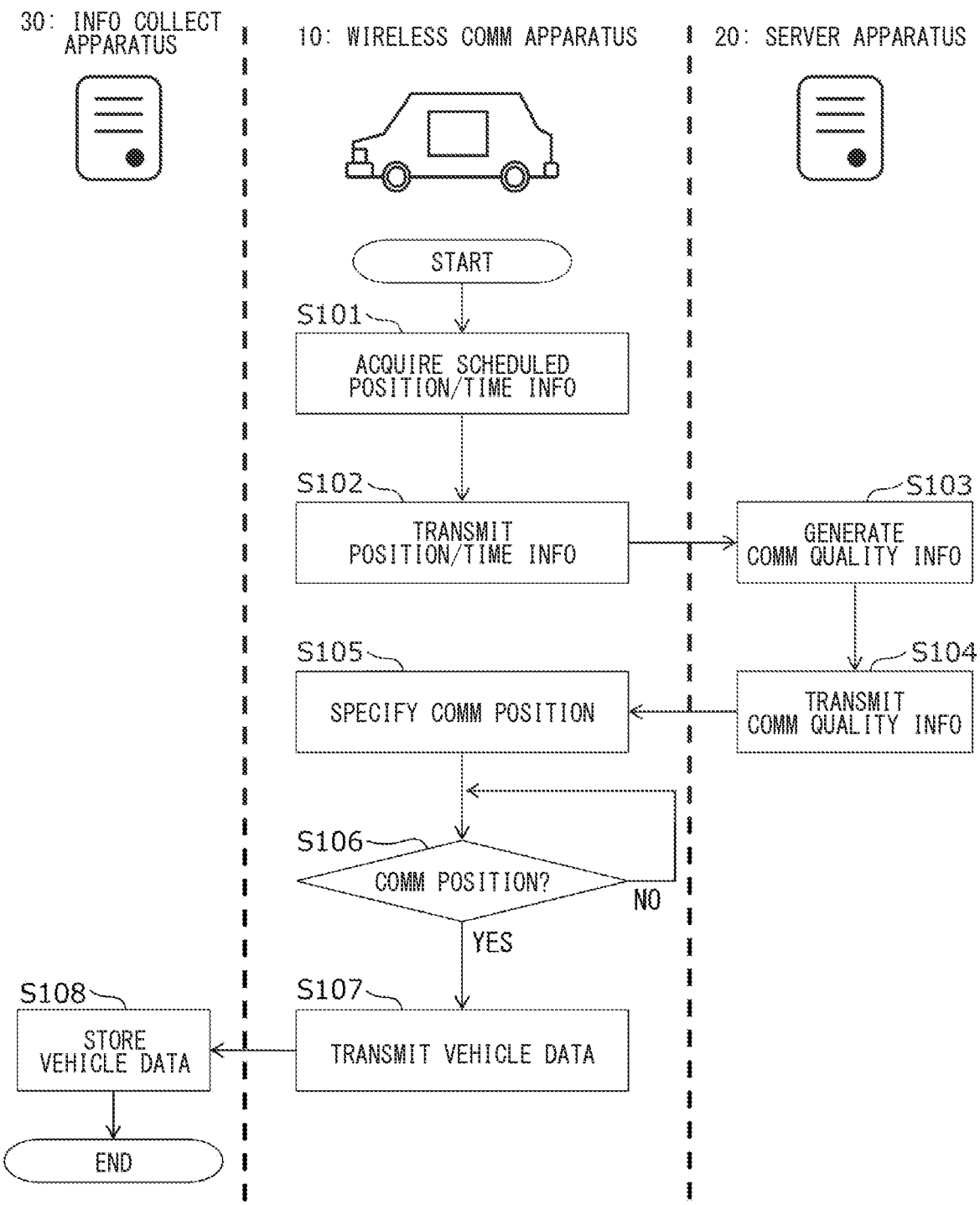
FIG. 3 is a diagram illustrating an operation of a wireless communication apparatus and a server apparatus according to the first to third embodiments.

A series of operations of the wireless communication apparatus 10, the server apparatus 20, and the information collecting apparatus 30 will be described with reference to FIG. 3.

First, in S101, the position where the vehicle is scheduled to move and the clock time when the vehicle reaches the position are acquired based on the traveling plan of the vehicle. In S102, the position information indicating the position and the time information indicating the clock time acquired in S101 are transmitted to the server apparatus 20. In S103, when the server apparatus 20 receives the position information and the time information, it generates the communication quality information corresponding to the position and the clock time indicated by the position information and the time information. In S104, the communication quality information generated in S103 is transmitted to the wireless communication apparatus 10. In S105, when the wireless communication apparatus 10 receives the communication quality information, it specifies the communication position for transmitting the vehicle data based on the communication quality information. In S106, it is determined whether or not the vehicle has reached the communication position. Here, if it is determined that the vehicle has reached the communication position, vehicle data is transmitted to the information collecting apparatus 30 in S107. In S108, when the information collecting apparatus 30 receives the vehicle data from the wireless communication apparatus 10, it stores it as data for big data.

In the above example, the wireless communication apparatus 10 transmits the position information and the time information to the server apparatus 20; the server apparatus 20 transmits the communication quality information corresponding to the position information and the time information to the wireless communication apparatus 10. The communication quality of wireless communication is affected by the number of communication terminals communicating in the communication area; however, the number of communication terminals in the communication area may vary depending on the time zone. Therefore, in order to obtain more accurate communication quality information, it is desirable that the wireless communication apparatus 10 transmits the position information and the time information to the server apparatus 20. However, the wireless communication apparatus 10 may transmit only the position information to the server apparatus 20. In this case, the server apparatus 20 transmits the communication quality information to the wireless communication apparatus 10 without considering the variation in the communication quality depending on the time zone.

Further, the wireless communication apparatus 10 may transmit data amount information indicating the data amount of vehicle data to the server apparatus 20 in addition to the position information and the time information. In this case, the communication quality information predicts the communication quality when transmitting data having the data amount indicated by the data amount information, and outputs the prediction result as the communication quality information. For example, when the vehicle data is a moving image taken by an in-vehicle camera and the amount of the data is relatively large, it is assumed that the transmission speed is extremely low when the moving image is transmitted as the vehicle data. In this way, when it is not possible to transmit a moving image having a large amount of data with a predetermined communication quality at the position and clock time corresponding to the position information and the time information, the quality information generating unit generates the communication quality information indicating that the communication quality is low. On the other hand, even if the position and clock time are the same, a predetermined communication quality may be obtained when data with a small amount of data is transmitted. In such a case, the quality information generating unit generates communication quality information indicating that the communication quality is high.

As described above, according to the present embodiment, the wireless communication apparatus 10 can (i) specify a position suitable for transmitting vehicle data based on the communication quality information transmitted from the server apparatus 20, and (ii) transmit the vehicle data at the specified position. As a result, it is possible to increase the certainty that vehicle data can be communicated in a desired band. Further, by using this embodiment, it becomes possible to distribute the communication load. Therefore, it is possible not only to cope with the increase in communication between the vehicle and the information collecting apparatus 30 in the future, but also to suppress the capital investment of the telecommunications carrier.

Second Embodiment

The present embodiment will describe a configuration in which the vehicle data is processed based on a period of time until the vehicle reaches the communication position, while focusing on the differences from the first embodiment. The controller circuit 105 (i.e., CPU) of the present embodiment realizes a data processing unit that processes vehicle data stored in the storage 103.

The data processing unit of the present embodiment processes the vehicle data stored in the storage 103 based on the period of time required for the vehicle to reach the communication position. The data processing performed by the data processing unit includes several methods illustrated below.

For example, the data processing unit adjusts the compression rate of the data stored in the storage 103 to be high when the period of time required to reach the communication position is longer than a predetermined period of time. For example, when the vehicle data is a moving image taken by an in-vehicle camera, the data processing unit increases the data compression rate by lowering the frame rate and resolution of the moving image. Alternatively, when the vehicle data is numerical data such as vehicle speed or temperature, the data compression rate is increased by thinning out the data or reducing the number of effective digits.

Until the vehicle reaches the communication position, the storage 103 stores vehicle data, which is scheduled to be transmitted to the information collecting apparatus 30. Therefore, if it takes a long period of time for the vehicle to reach the communication position, the total amount of vehicle data may exceed the capacity of the storage 103. In such a case, a part of the vehicle data may be destroyed without being transmitted to the information collecting apparatus 30. Therefore, in the present embodiment, when the period of time required for the vehicle to reach the communication position is longer than a predetermined period of time, the compression rate of the data stored in the storage 103 is adjusted to allow more vehicle data to be stored in the storage 103. This prevents the vehicle data from being destroyed without being transmitted to the information collecting apparatus 30.

As another example, when the period of time required to reach the communication position is longer than a predetermined period of time, the data processing unit sequentially deletes the vehicle data in an order (i.e., ascending order) from the data having the lowest "priority" among the vehicle data stored in the storage 103. In this example, the vehicle data and the information indicating the priority of the vehicle data are stored in association with each other in the storage 103.

Here, the "priority" is an index classified based on a predetermined evaluation standard, and the number of classifications may be several.

Even if respective data belong to the same vehicle data, one vehicle data may have a high priority and need to be collected by the information collecting apparatus 30 and another vehicle data may have a low priority. For example, when the vehicle data is a moving image or a still image, one image may be an image in which a photographic subject is clearly reflected and another image may be an image in which a photographic subject is unclear due to an obstacle such as another vehicle. In such a case, even if the image whose photographic subject is unclear is transmitted to the information collecting apparatus 30, the possibility that the data is utilized is low and the priority is thus low. Further, the image acquired when the speed of the vehicle is low also has a low priority because the photographic subject changes little.

On the other hand, for example, (i) an image of an obstacle on the road or (ii) an image different from the image previously registered in the map information of the navigation system has a high need for data. Further, vehicle data related to road traffic, for example, (i) vehicle speed data used for determining traffic congestion or (ii) images related to vehicle accidents have a high priority because they are data that require freshness of information. Therefore, it is desirable to set a high priority for data that requires freshness of information in this way, such as data related to road traffic or data with high real-time performance.

This priority may be set by each ECU that acquires vehicle data, or the controller circuit 105 (i.e., CPU) of the wireless communication apparatus 10 in the present embodiment may determine the content of the vehicle data and set the priority.

Even if the period of time required to reach the communication position is shorter than the predetermined period of time, the data processing unit may delete the vehicle data in order (i.e., ascending order) from the data having the lowest priority when the amount of acquired vehicle data exceeds the capacity of the storage 103.

According to the present embodiment, by processing the vehicle data based on the period of time until the vehicle reaches the communication position, the vehicle data can be transmitted to the information collecting apparatus 30 without being destroyed.

Third Embodiment

The present embodiment will describe the configuration which changes the communication service based on the priority of the vehicle data described in the second embodiment for reliably transmitting the vehicle data, which is highly necessary, to the information collecting apparatus 30, while focusing on the differences from the first and second embodiments.

In addition to the vehicle data, the storage 103 of the present embodiment stores the priorities described in the second embodiment in advance in association with the vehicle data.

The controller circuit 105 (i.e., CPU) of the present embodiment realizes a determining unit that determines a communication service for transmitting vehicle data. The determining unit determines whether to transmit using the first communication service that communicates at the communication position specified by the position specifying unit or the second communication service that communicates regardless of the position of the vehicle.

As described in the first embodiment, the first communication service is a service applied when the vehicle communicates at a specific position, that is, a communication position. Therefore, when it takes a long period of time for the vehicle to reach the communication position, it is desirable to apply a configuration which compresses or deletes the vehicle data, as described in the second embodiment, to thereby transmit the vehicle data to the information collecting apparatus 30 without being destroyed. However, even if the second embodiment is adopted, if the period of time required to reach the communication position is extremely long, there is a risk that the total amount of vehicle data exceeds the capacity of the storage 103 and the necessary vehicle data is discarded. Therefore, in the present embodiment, when the predetermined condition is satisfied, the important vehicle data is transmitted to the information collecting apparatus 30 by transmitting the vehicle data to the information collecting apparatus 30 using the second communication service to thereby prevent the important vehicle data from being destroyed without being transmitted.

The determining unit compares the priority associated with the vehicle data with a predetermined priority. Then, when the priority of the vehicle data is equal to or lower than the predetermined priority, the determining unit determines that the first communication service is used as in the first and second embodiments, that is, that the vehicle waits for the communication position to be reached to transmit the vehicle data by using the first communication service. On the other hand, when the priority of the vehicle data is higher than the predetermined priority, it is determined that the vehicle data is transmitted using the second communication service.

When the vehicle data is transmitted using the second communication service, the communication load in the second communication service becomes high, which may affect the communication of user data. Therefore, only the vehicle data having a high priority is transmitted using the second communication service. As a result, important vehicle data can be reliably transmitted to the information collecting apparatus 30 while minimizing the influence of the user data on the communication.

In addition to the priority of the vehicle data, the determining unit of the present embodiment may determine that the vehicle data is transmitted by using the second communication service when other conditions are satisfied.

For example, the determining unit may determine whether to transmit the vehicle data using the second communication service based on the amount of user data communicated using the second communication service in addition to the priority of the vehicle data.

In this example, the determining unit compares the amount of user data used by the user of the vehicle with a predetermined amount of data set in advance. Then, when the priority of the vehicle data is higher than the predetermined priority and the data amount of the user data is smaller than the predetermined data amount, it is determined that the vehicle data is transmitted by using the second communication service.

As described above, it is desirable that the vehicle data having a high priority is reliably transmitted to the information collecting apparatus 30. However, a user data such as a vehicle travel control data has a higher priority than a vehicle data used for big data. It is thus undesirable to interfere with the communication of such a user data. Therefore, the vehicle data is transmitted by using the second communication service only when the data amount of the user data being communicated is smaller than a predetermined data amount and the possibility of interfering with the communication of the user data is low.

Here, the amount of user data determined by the determining unit may be not only the amount of real-time data but also the amount of data that the communicator device 104 may communicate in the future (i.e., a value that predicts the future amount of user data). The amount of user data may change depending on the travel state of the vehicle and the actions of the user of the vehicle. For example, the amount of user data varies depending on whether the vehicle is manually driven or automatically driven, or whether the user needs entertainment data in the vehicle. Therefore, even if the determining unit determines that the current amount of user data is less than a predetermined amount of data, the amount of user data may be significantly increased by the user of the vehicle downloading music or the like after a few seconds. Therefore, the determining unit predicts the future amount of the user data and determines the communication service used for transmitting the vehicle data.

The determining unit predicts the amount of user data, for example, based on the number of passengers as users in the vehicle. When the number of passengers in the vehicle is large, there is a high possibility that entertainment data will be communicated, and it is possible that the amount of user data will increase. Further, when the vehicle travels in an area where detailed travel control is required from the navigation system or the like mounted on the vehicle, it is considered that the amount of user data for controlling the vehicle increases. From these parameters, the determining unit predicts the amount of user data that the communicator device 104 will receive in the future, and determines whether or not the predicted amount of data is less than the predetermined amount of data. In addition to the parameters described above, the determining unit may predict the amount of user data based on the attribute of a passenger of the vehicle (e.g., age, gender), the user's past communication record, and the connection status of the in-vehicle WiFi (registered trademark).

In another example, the determining unit may further determines whether the period of time required for the vehicle to reach the communication position is longer than a predetermined period of time, as in the second embodiment. Thereby, it is determined that the vehicle data is transmitted using the second communication service only when the priority of the vehicle data is higher than the predetermined priority and the period of time required to reach the communication position is longer than the predetermined period of time.

As yet another example, the determining unit may determine whether or not the amount of vehicle data stored in the storage 103 is larger than the predetermined amount of data. Then, only when the priority of the vehicle data is higher than the predetermined priority and the amount of vehicle data stored in the storage 103 is larger than the predetermined amount of data, the determining unit may determine that the vehicle data is transmitted using the second communication service. If the amount of vehicle data stored in the storage 103 is larger than the predetermined amount of data, the vehicle data may exceed the capacity of the storage 103 and the necessary data may be discarded without being stored. Therefore, when the data amount of the vehicle data stored in the storage 103 is larger than the predetermined data amount, the determining unit may determine that the vehicle data is transmitted using the second communication service.

According to the present embodiment, the vehicle data is transmitted regardless of the position of the vehicle by using the second communication service used for communication of user data only when a predetermined condition is satisfied. This makes it possible to prevent the important vehicle data from being destroyed without being transmitted to the information collecting apparatus 30.

(Overview)

The features of the wireless communication apparatus 10 and the server apparatus 20 in each embodiment of the present disclosure have been described above.

Terms used in the description of each embodiment are examples and may be replaced with synonymous terms or terms having a synonymous function.

The functional block diagram used in the description of each embodiment is a diagram in which the configurations of apparatuses and the like are classified and organized by functions. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the functions are shown, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms "first", "second", or "N" (N is an integer) used in each embodiment and the present disclosure are used to distinguish two or more configurations or methods of the same type, it does not limit the order or superiority.

Further, examples of the form of the wireless communication apparatus of the present disclosure include the following. Examples of the form of the element or component include a semiconductor element, an electronic circuit, a module, and a microcomputer. Examples of the semi-finished product include an electronic control unit (ECU) and a system board. In addition, a device having a communication function and the like are included; examples of such a device include a video camera, a still camera, and a car navigation system.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. Consequently, when the program is upgraded, the latest function is always provided.

INDUSTRIAL APPLICABILITY

The present disclosure can be applied to a wireless communication apparatus mounted on a mobile body and a server apparatus capable of transmitting and receiving data to and from the wireless communication apparatus.

For reference to further explain features of the present disclosure, the description is added as follows.

In recent years, the demand for services utilizing big data has been increasing. In particular, in the field of automobiles, various data indicating the behavior of automobiles and the internal and external conditions of automobiles acquired by sensors mounted on automobiles are collected and used for safe driving of automobiles and automatic driving technology.

The data used for big data is transmitted to an information collecting apparatus installed outside the vehicle using an in-vehicle wireless communication apparatus mounted on the vehicle. By the way, the in-vehicle wireless communication apparatus is used for transmission/reception of other data in addition to the big data; other data include (i) control data of an automatically driven vehicle, (ii) road traffic data, and (iii) music and video data. Since such other data are often required in real time, it is desirable to perform communication at any time when data transmission/reception is required. On the other hand, since data for big data is not necessarily required to have real-time performance, it is desirable that the data be communicated without interfering with the transmission/reception of other data requiring real-time performance.

As a method of communicating data for big data that does not require real-time performance, it is conceivable to use a time zone when the network is not congested. For example, there is disclosed a technology of background data transfer in 3GPP communication. According to the technology, AF (Application Function) transmits information on (i) the number of communication terminals to communicate, (ii) the amount of communication data, and (iii) the time zone in which communication is desired to PCF (Policy Control Function), whereas PCF returns a transfer policy containing information about the recommended time zone for communication to AF. In this way, by negotiating the time zone for data communication between AF and PCF, data communication can be realized at an appropriate time zone.

3GPP background data transfer is a method of negotiating the time zone for data communication using information on the number of communication terminals. Therefore, for example, it is useful when the server communicates with a predetermined number of communication terminals. However, the wireless communication terminal mounted on the vehicle always communicates while moving. Therefore, it is difficult to negotiate based on (i) the number of communication terminals in the area where the wireless communication terminals communicate and/or (ii) the timing at which each communication terminal desires communication.

Therefore, it is difficult to apply the 3GPP background data transfer method to the communication between the wireless communication terminal mounted on the vehicle and the server apparatus that collects big data.

It is thus desired to provide an in-vehicle wireless communication apparatus capable of transmitting data for big data to an information collecting apparatus without affecting a communication of user data used by a user of a vehicle, a program and method used for the apparatus, and a server apparatus for communicating with the in-vehicle wireless communication apparatus.

An aspect of the present disclosure described herein is set forth in the following clauses.

According to an aspect of the present disclosure, a wireless communication apparatus mounted on a mobile body is provided to include a transmitter, a receiver, and a position specifying unit. The transmitter is configured to transmit position information indicating a position to which the mobile body is scheduled to move, to a server apparatus that manages a wireless communication infrastructure apparatus. The receiver is configured to receive communication quality information indicating a communication quality corresponding to the position from the server apparatus. The position specifying unit is configured to specify a communication position to transmit a data based on the communication quality information. Herein, the transmitter is configured to transmit the data at the communication position.

The present disclosure can be applied to, in addition to the above wireless communication apparatus mounted on a mobile body, other forms such as a server apparatus capable of transmitting and receiving data to and from the wireless communication apparatus, a communication control method, a communication control program, a communication quality providing method. The various forms to which the present disclosure applied allow the wireless communication apparatus mounted on the mobile body to transmit data for big data at an appropriate timing.

What is claimed is:

1. A wireless communication apparatus mounted on a mobile body, comprising:
   a transmitter configured to transmit position information indicating a position to which the mobile body is scheduled to move, to a server apparatus that manages a wireless communication infrastructure apparatus;
   a receiver configured to receive communication quality information indicating a communication quality corresponding to the position, from the server apparatus; and
   a position specifying unit configured to specify a communication position to transmit a data, based on the communication quality information;
   wherein:
   the transmitter is configured to transmit the data at the communication position;
   the transmitter is configured to further transmit time information indicating a clock time when the mobile body is scheduled to reach the position, to the server apparatus; and
   the receiver is configured to receive the communication quality information indicating the communication quality corresponding to the position and the clock time.

2. The wireless communication apparatus according to claim 1, wherein:
   the transmitter is configured to further transmit data amount information indicating a data amount of the data, to the server apparatus; and
   the receiver is configured to receive the communication quality information indicating the communication quality when transmitting the data having the data amount.

3. A server apparatus that communicates with the wireless communication apparatus according to claim 2,
   the server apparatus comprising:
   a receiver configured to receive position information transmitted from the wireless communication apparatus;
   a communication quality information generating unit configured to generate communication quality information indicating a communication quality corresponding to a position indicated by the position information; and
   a transmitter configured to transmit the communication quality information to the wireless communication apparatus.

4. A computer-implemented communication quality providing method executed by a computer for a server apparatus communicating with the wireless communication apparatus according to claim 2,
   the communication quality providing method comprising:
   receiving position information transmitted from the wireless communication apparatus;
   generating communication quality information indicating a communication quality corresponding to a position indicated by the position information; and
   transmitting the communication quality information to the wireless communication apparatus.

5. A wireless communication apparatus mounted on a mobile body, comprising:
   a transmitter configured to transmit position information indicating a position to which the mobile body is scheduled to move, to a server apparatus that manages a wireless communication infrastructure apparatus;
   a receiver configured to receive communication quality information indicating a communication quality corresponding to the position, from the server apparatus;
   a position specifying unit configured to specify a communication position to transmit a data, based on the communication quality information;
   a storage configured to store the data until the data is transmitted from the transmitter; and
   a data processing unit configured to adjust a compression rate of the data stored in the storage based on a period of time until the mobile body reaches the communication position;
   wherein the transmitter is configured to transmit the data at the communication position.

6. The wireless communication apparatus according to claim 5, wherein:
   the transmitter is configured to further transmit time information indicating a clock time when the mobile body is scheduled to reach the position, to the server apparatus; and
   the receiver is configured to receive the communication quality information indicating the communication quality corresponding to the position and the clock time.

7. A server apparatus that communicates with the wireless communication apparatus according to claim 5,
   the server apparatus comprising:
   a receiver configured to receive position information transmitted from the wireless communication apparatus;
   a communication quality information generating unit configured to generate communication quality information indicating a communication quality corresponding to a position indicated by the position information; and a transmitter configured to transmit the communication quality information to the wireless communication apparatus.

8. A computer-implemented communication quality providing method executed by a computer for a server apparatus communicating with the wireless communication apparatus according to claim 5, the communication quality providing method comprising:
receiving position information transmitted from the wireless communication apparatus;
generating communication quality information indicating a communication quality corresponding to a position indicated by the position information; and
transmitting the communication quality information to the wireless communication apparatus.

9. A wireless communication apparatus mounted on a mobile body, comprising:
a transmitter configured to transmit position information indicating a position to which the mobile body is scheduled to move, to a server apparatus that manages a wireless communication infrastructure apparatus;
a receiver configured to receive communication quality information indicating a communication quality corresponding to the position, from the server apparatus;
a position specifying unit configured to specify a communication position to transmit a data, based on the communication quality information;
a storage configured to store in association with each other (i) the data and (ii) information indicating a priority of the data, until the data is transmitted from the transmitter; and
a data processing unit configured to delete the data stored in the storage in an order from the data having the priority being lowest based on a period of time until the mobile body reaches the communication position;
wherein the transmitter is configured to transmit the data at the communication position.

10. The wireless communication apparatus according to claim 9, wherein:
the transmitter is configured to further transmit time information indicating a clock time when the mobile body is scheduled to reach the position, to the server apparatus; and
the receiver is configured to receive the communication quality information indicating the communication quality corresponding to the position and the clock time.

11. A server apparatus that communicates with the wireless communication apparatus according to claim 9,
the server apparatus comprising:
a receiver configured to receive position information transmitted from the wireless communication apparatus;
a communication quality information generating unit configured to generate communication quality information indicating a communication quality corresponding to a position indicated by the position information; and
a transmitter configured to transmit the communication quality information to the wireless communication apparatus.

12. A computer-implemented communication quality providing method executed by a computer for a server apparatus communicating with the wireless communication apparatus according to claim 9,
the communication quality providing method comprising:
receiving position information transmitted from the wireless communication apparatus;
generating communication quality information indicating a communication quality corresponding to a position indicated by the position information; and
transmitting the communication quality information to the wireless communication apparatus.

13. A wireless communication apparatus mounted on a mobile body, comprising:
a transmitter configured to transmit position information indicating a position to which the mobile body is scheduled to move, to a server apparatus that manages a wireless communication infrastructure apparatus;
a receiver configured to receive communication quality information indicating a communication quality corresponding to the position, from the server apparatus; and
a position specifying unit configured to specify a communication position to transmit a data, based on the communication quality information;
wherein the transmitter is configured to transmit the data at the communication position,
wherein the wireless communication apparatus communicates using a first communication service that communicates at the communication position or using a second communication service that communicates regardless of a position of the mobile body,
wherein the wireless communication apparatus further comprises:
a storage configured to store in association with each other (i) the data and (ii) information indicating a priority of the data; and
a determining unit configured to determine whether to transmit the data using the first communication service or the second communication service based on the priority of the data,
and wherein based on a determination result by the determining unit,
in response to the priority of the data being not higher than a predetermined priority, the transmitter is configured to transmit the data by using the first communication service, and
in response to the priority of the data being higher than the predetermined priority, the transmitter is configured to transmit the data by using the second communication service.

14. The wireless communication apparatus according to claim 13, wherein:
the data is vehicle data acquired by a sensor mounted on a vehicle being the mobile body;
the receiver is configured to further receive user data, which is data used by a user of the vehicle, using the second communication service; and
in response to the priority of the data being higher than the predetermined priority and a data amount of the user data being smaller than a predetermined data amount, the determining unit is configured to determine that the data is transmitted using the second communication service.

15. The wireless communication apparatus according to claim 14, wherein:
the data amount of the user data is predicted as the data amount of the user data that the receiver receives in future.

16. The wireless communication apparatus according to claim 13, wherein:
the transmitter is configured to further transmit time information indicating a clock time when the mobile body is scheduled to reach the position, to the server apparatus; and the receiver is configured to receive the communication quality information indicating the communication quality corresponding to the position and the clock time.

17. A server apparatus that communicates with the wireless communication apparatus according to claim 13, the server apparatus comprising:

a receiver configured to receive position information transmitted from the wireless communication apparatus;

a communication quality information generating unit configured to generate communication quality information indicating a communication quality corresponding to a position indicated by the position information; and a transmitter configured to transmit the communication quality information to the wireless communication apparatus.

18. A computer-implemented communication quality providing method executed by a computer for a server apparatus communicating with the wireless communication apparatus according to claim 13, the communication quality providing method comprising:

receiving position information transmitted from the wireless communication apparatus;

generating communication quality information indicating a communication quality corresponding to a position indicated by the position information; and transmitting the communication quality information to the wireless communication apparatus.

* * * * *